(12) United States Patent
Hennequet et al.

(10) Patent No.: US 6,389,919 B1
(45) Date of Patent: May 21, 2002

(54) COMPACT GEARBOX

(75) Inventors: Gonzalo-Antoine Hennequet, Rueil Malmaison; Jean-Michel Lamy, Paris, both of (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/462,070

(22) PCT Filed: Apr. 30, 1999

(86) PCT No.: PCT/FR99/01034

§ 371 Date: Apr. 11, 2000

§ 102(e) Date: Apr. 11, 2000

(87) PCT Pub. No.: WO99/57463

PCT Pub. Date: Nov. 11, 1999

(30) Foreign Application Priority Data

May 5, 1998 (FR) .............................. 98 05675

(51) Int. Cl.$^7$ ..................... F16H 59/04; F16H 63/32
(52) U.S. Cl. ........................ 74/473.37; 74/375
(58) Field of Search ...................... 74/339, 473.11, 74/473.24, 473.25, 473.26, 473.36, 473.37, 375

(56) References Cited

U.S. PATENT DOCUMENTS

| 3,929,029 | A | * | 12/1975 | Kelbel .................... 74/473.21 |
| 4,320,824 | A | * | 3/1982 | Takahashi et al. .......... 192/115 |
| 4,472,868 | A | * | 9/1984 | Takahashi ............ 74/473.37 X |
| RE34,260 | E | * | 5/1993 | Markyvech et al. .. 74/473.11 X |
| 5,473,959 | A | * | 12/1995 | Lasoen ........................ 74/335 |

* cited by examiner

Primary Examiner—Allan D. Herrmann
(74) Attorney, Agent, or Firm—Oblon, Spivak, McClelland, Maier & Neustadt, P.C.

(57) ABSTRACT

A motor vehicle gear box which includes at least two parallel longitudinal shafts and at least two gear assemblies including an idler of the first shaft geared to a stationary pinion of the second shaft. Coaxial rings are provided for jaw clutching the idlers on their shafts. The gear shift yokes of the rings are controlled, and the yokes are mounted sliding longitudinally and are provided with transverse legs having ends which bear contact keys, transversely aligned along an arc, which can be received in an actuator fork, and which is capable of being controlled in transverse movement along the arc and parallel to the shafts for selecting respectively one yoke, and engaging the associated ratio by displacing the yoke longitudinally. The yokes are mounted sliding on a common longitudinal axle.

9 Claims, 3 Drawing Sheets

COMPACT GEARBOX

BACKGROUND OF THE INVENTION

1. Field of the Invention

The invention relates to a gearbox for a motor vehicle.

The invention relates more particularly to a motor-vehicle gearbox of the type provided with at least two longitudinal parallel shafts, the primary and secondary, of the type provided with at least two gear pairs, in each of which an idler pinion, mounted to rotate on a first shaft, engages with a fixed pinion supported by a second shaft, and of the type provided with means for interlocking each idler pinion on its shaft by means of axially movable coaxial bands, under the action of operating means provided with operating forks which are mounted to slide in parallel on the shafts, each of which forks is equipped with a transverse foot, at the end of which there is provided a contact toe, the toes being aligned transversely along an arc of a circle to be received in a yoke of an actuator which can be driven in transverse displacement along the arc of the circle to select a fork associated with a gear reduction ratio, and parallel to the shafts to engage the ratio associated with the selected fork by longitudinally displacing a band for interlocking of the idler pinion corresponding to this ratio.

2. Discussion of the Background

There are known numerous gearboxes provided with operating means for interlocking of idler pinions on the shafts supporting them, in such a manner as to cause their engagement with the associated fixed pinions belonging to at least one other shaft and thus selectively to engage specified gear reduction ratios associated with the said idler pinions.

Motor-vehicle gearboxes conventionally rely on interlocking devices with synchronizers of the type of those cited hereinabove, the said synchronizers being capable of being axially displaced by the forks supported by axles, and being capable of being actuated longitudinally the vehicle driver by means of a gear change lever disposed in the passenger compartment of the vehicle. In the case of a "manual" gearbox, the gear change lever actuates a rod assembly which acts directly on the forks, and in the case of a "robotized" or automatic gearbox, the gear change lever indirectly drives the displacement of the forks, especially by means of hydraulic cylinders or other types of actuators.

French Patent Application A 2609138 describes such a device.

That document describes more particularly an architecture for an automatic gearbox in which interlocking of the idler pinions on their shaft and displacement of the synchronizers parallel to this shaft is achieved by forks displaced by actuators, in this case hydraulic cylinders. Each fork is displaced by an associated actuator.

This arrangement is particularly bulky, because it necessitates a large number of forks, fork axles and actuators.

To reduce the space requirement of such devices and to reduce the manufacturing costs, it has been proposed that there be used only a single actuator capable of consecutively driving the displacements of a plurality of forks.

Such a device is described in German Patent Application DE A 3600185.

In that device, an actuator is provided with an arm, at the end of which a toe is capable of being displaced in rotation and in translation respectively to select a fork and engage a ratio associated with the fork in question by displacing it parallel to the shaft of the gearbox.

SUMMARY OF THE INVENTION

The described device has a certain advantage compared with the preceding device to the extent that the number of actuators is considerably reduced. Nevertheless, it remains very bulky because of the multiplicity of fork axles and of their arrangement in which they are distributed transversely.

To remedy these disadvantages, the invention proposes to improve the compactness of the gearbox by reducing its transverse space requirement.

For this purpose, the invention proposes a gearbox of the type mentioned hereinabove, characterized in that all operating forks are mounted to slide on a common fork axle, parallel to the shafts.

According to other characteristics of the invention:

at most one interlocking band is provided close to an idler pinion, to occupy selectively a neutral position or an interlocked position of the single pinion in question, the said interlocked position corresponding to engagement of a gear reduction ratio, and in that the other interlocking bands are provided between two idler pinions, to occupy a neutral position or two opposite interlocked positions of each of the idler pinions in question, the said interlocked positions being situated axially on the two sides of the neutral position and each corresponding to engagement of a gear reduction ratio;

the actuator is provided with a rod, longitudinal and parallel to the shafts, which is provided with a transverse arm, at the end of which there is provided the yoke, which can occupy a plurality of predefined angular selection positions, each of which corresponds to selection of a fork, and at least two predefined longitudinal shift positions, which comprise at least one extreme longitudinal position of engagement of one of the gear reduction ratios and a neutral position;

the fork axle is coaxial with the rod of the actuator;

the idler pinions and the associated interlocking bands are provided axially on the first shaft of the gearbox;

the gearbox is a box with robotized operation and the actuator is a rotolinear hydraulic cylinder moved by stepping motors, driven in response to movements of a vehicle gear change lever on which the driver acts;

the gearbox is operated manually and the actuator is linked by a rod assembly to the vehicle gear change lever on which the driver acts.

BRIEF DESCRIPTION OF THE DRAWINGS

Other characteristics and advantages of the invention will become clear from reading the detailed description hereinafter, which will be understood by referring to the attached drawings, wherein.

DESCRIPTION OF THE PREFERRED EMBODIMENTS

The figures show the assembly of operating means 10 of a gearbox (not illustrated) according to one embodiment of the invention.

Figure 4:
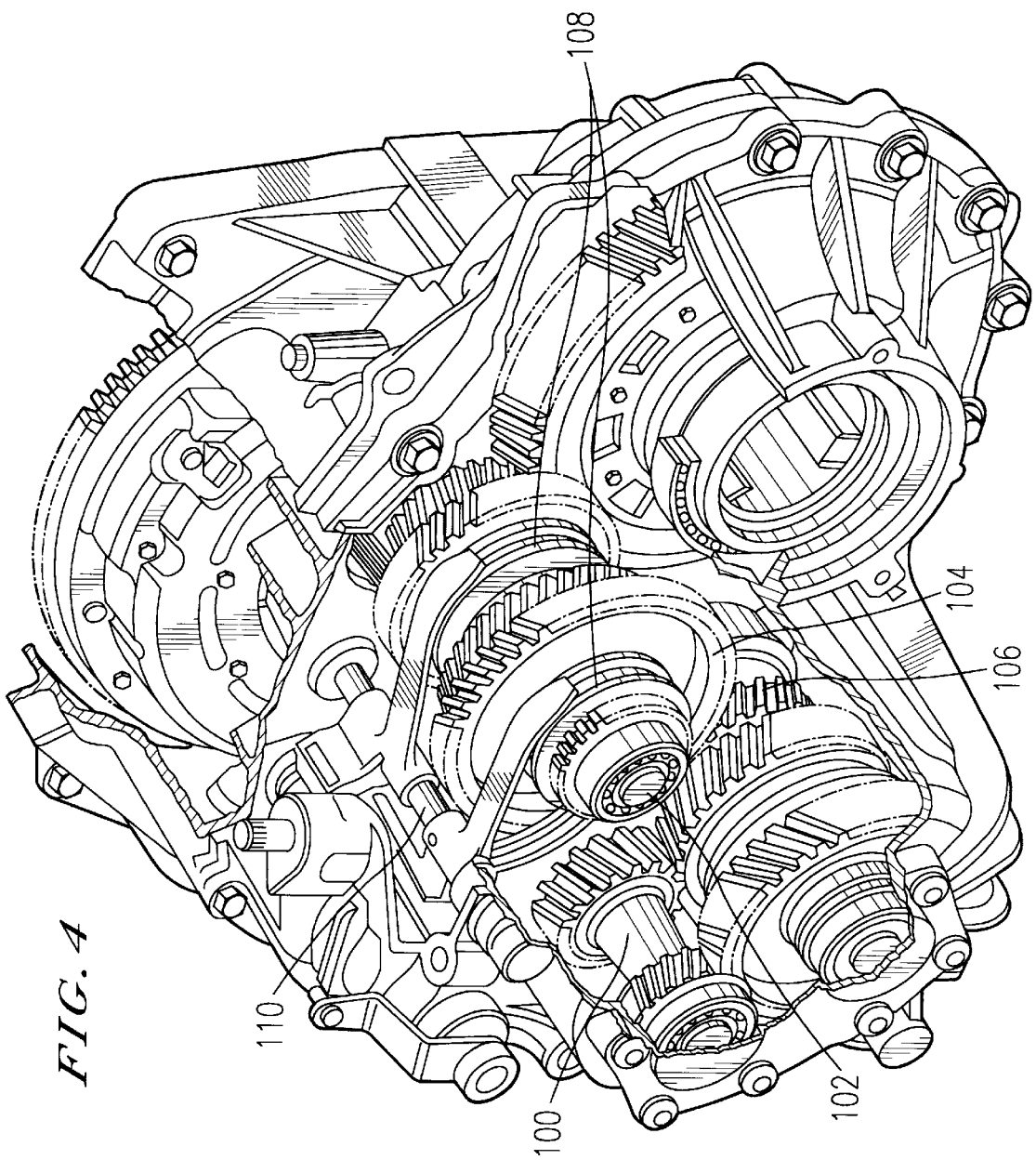
FIG. 4 is an illustration of a conventional gearbox.

FIG. 4 illustrates a conventional gearbox including two longitudinally parallel shafts including a primary shaft 100 and a secondary shaft 102, gears pairs including idler pinions 104 and fixed pinions 106, coaxial interlocking bands 108, and a fork axle 110. The conventional gearbox is illustrated for background information, and one of ordinary skill in the art will readily recognize the manner in which the gearbox can be utilized with the present invention as described in detail herein.

Forks 12 are capable in known manner of sliding longitudinally in a longitudinal direction to cooperate with bands for interlocking the idler pinions of the gearbox.

The longitudinal displacement along a pinion shaft axis L of the interlocking bands by forks 12 causes, for each of the idler pinions, interlocking of the idler pinion on the shaft supporting it and engagement of a gear reduction ratio. In the preferred embodiment of the invention, the idler pinions permitting engagement of different ratios of the gearbox are seven in number, and they are operated by the interlocking of four bands disposed, in common with the idler pinions, on a common shaft of the gearbox.

According to the invention, forks 12 extend transversely downward from an axle 14 for guidance of forks 12, with longitudinal geometric axis A1, which permits their longitudinal displacement along L by means of sleeves 16 for guidance of forks 12, mounted to slide on fork axle 14. Fork axle 14 is cylindrical and is provided with a longitudinal keyway 18, designed to cooperate with a form of key 20 supported by a bore 22 of each of sleeves 16 of forks 12. In this way, sleeves 16 and, consequently, forks 12 are guided in translation along axle 14 and are immobilized in rotation relative to this common axle 14.

According to the invention, each fork 12 is provided with a transverse foot 22, which is substantially diametrically opposite fork 12 relative to fork axis 14, is physically integral with sleeve 16, and is provided at its free end with an operating toe 24, which has two parallel and transversely oriented bearing surfaces 26 and 28.

Figure 2:
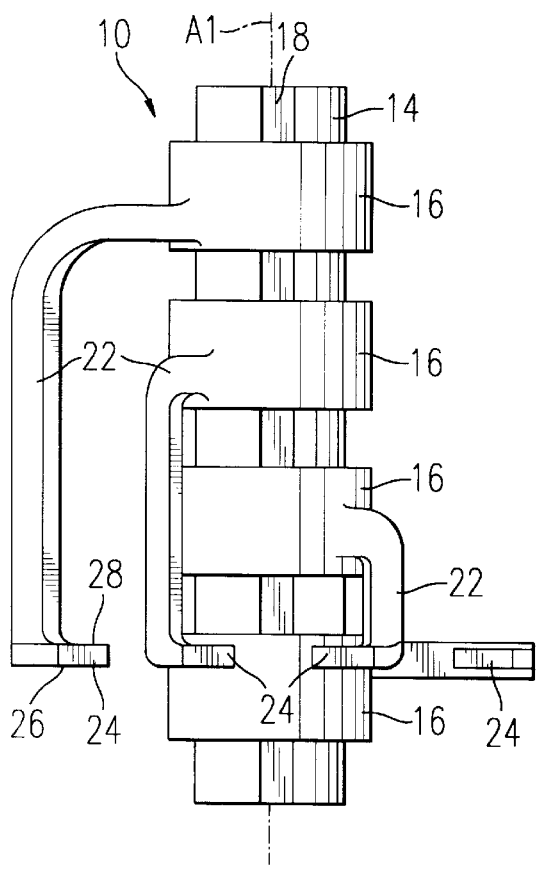
FIG. 2 is a top view of the operating means according to FIG. 1 on which all forks are illustrated in neutral position.

As illustrated in reference represented in FIG. 2, in a dead-point position of the gearbox, sleeves 16 of forks 12 are disposed longitudinally on axle 14 at regular intervals, such that each fork 12 occupies an intermediate longitudinal position between two consecutive idler pinions of the gearbox, such that none of the interlocking bands of the idler pinions cause interlocking of any one of the idler pinions of the gearbox.

Figure 3:
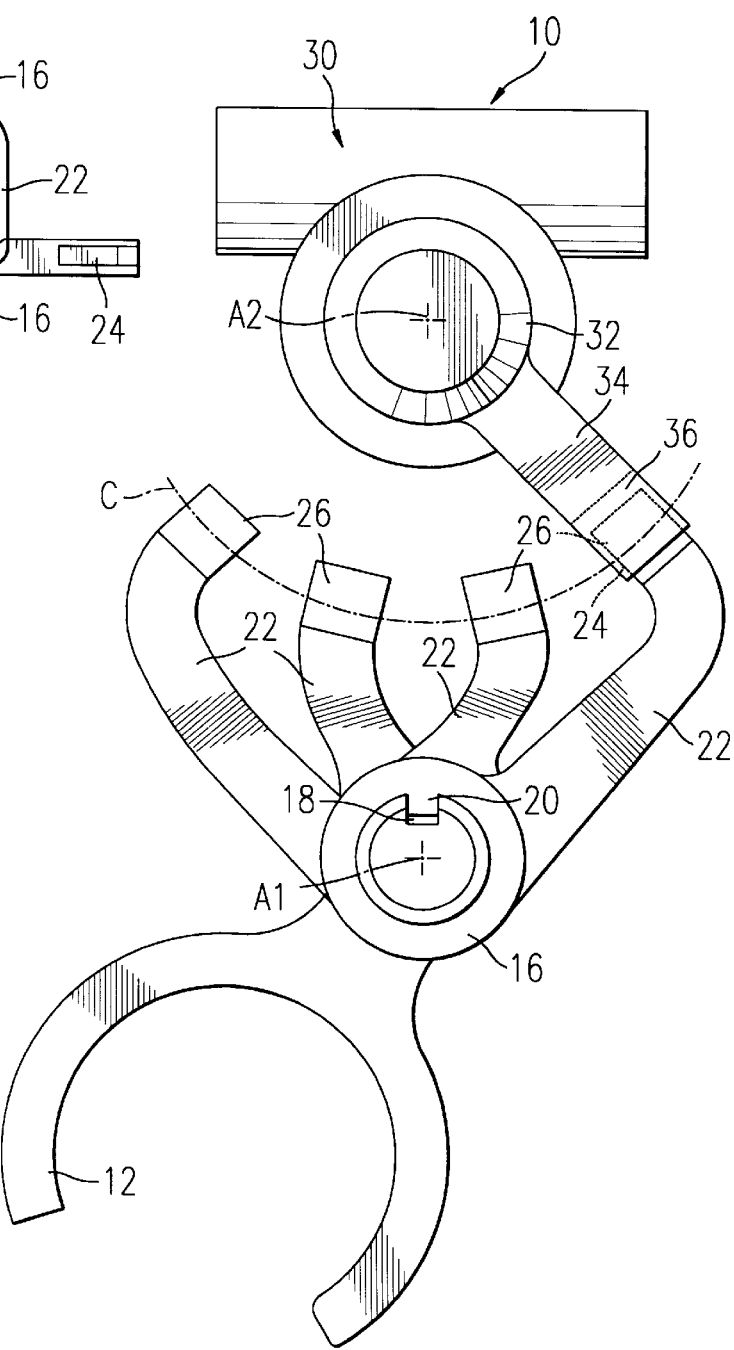
FIG. 3 is a view along the axis of the forks of the operating means according to FIG. 2.

In this configuration, operating toes 24 of forks 12 are all situated in a common transverse plane and, as can be seen more precisely in FIG. 3, they are disposed along an arc C of a circle in this transverse vertical plane. This arrangement is made possible by a particular form of each of the transverse arms 22, which are curved to extend transversely and longitudinally such that toes 24 are coplanar in the transverse plane.

According to the invention, the gearbox is provided with an actuator 30, disposed above axle 14 of forks 12, one longitudinal rod 32 of which having axis A2 parallel to the shaft supporting the interlocking bands of the gearbox is provided with a transverse arm 34, at the end of which there is provided an operating yoke 36.

In an alternative version (not illustrated), axis A2 of rod 32 of actuator 30 and axis A1 of fork axle 14 can be combined to achieve an advantageous reduction of the total space requirement of the operating means.

In a preferred embodiment of the invention, actuator 30 is a rotolinear hydraulic cylinder which drives the displacements of rod 32 in translation in both senses along longitudinal direction L and in rotation in both senses around its longitudinal axis.

In an alternative version, the actuator can be simply constituted by a rod integral with a vehicle-gearbox rod assembly, with a cable-operated system or with any other mechanical transmission process, actuated by the driver by means of a gear change lever.

Axis A2 of longitudinal rod 32 of actuator 30 passes through center C of arc C of a circle of toes 24 of transverse arms 22 of forks 12, such that yoke 36, situated at the end of arm 34 of adequate length, can be displaced in circular translation movement in the transverse plane of toes 24 of forks 12.

Figure 1:
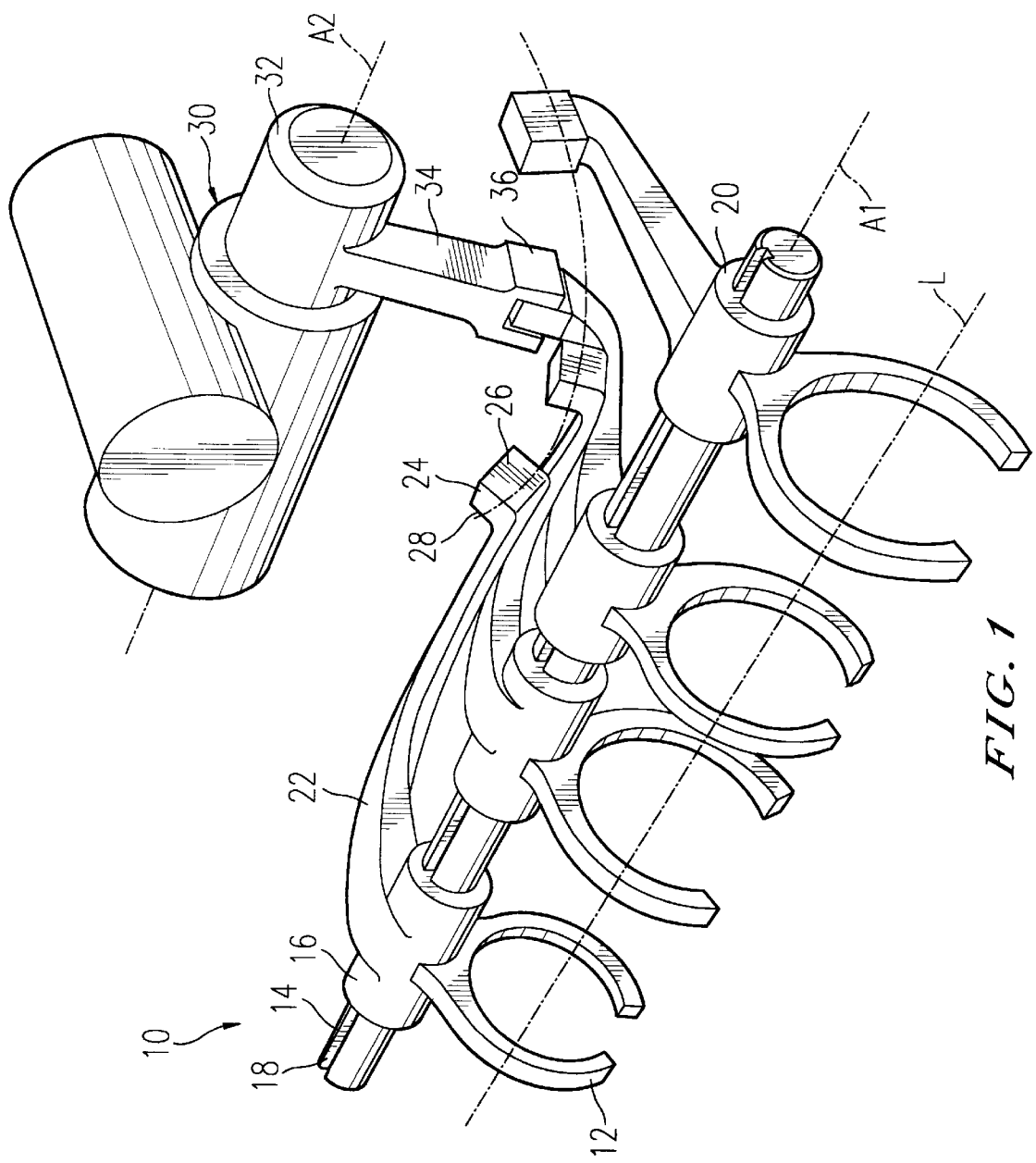
FIG. 1 is a perspective view of operating means of a gearbox according to the invention, on which one of the forks is illustrated in its position of selection and engagement of a ratio.

In this way, and as illustrated in FIG. 1, the engagement of a gearbox ratio comprises two main phases:

a first phase, that of selection, in which, starting from a neutral dead-point position of the gearbox described with reference to FIGS. 2 and 3, a rotational movement of rod 32 of the actuator causes the rotational displacement of yoke 36 in the transverse plane corresponding to the neutral position of the gearbox, such that it stops facing a toe 24 of one fork 12 of the gearbox.

In the preferred embodiment of the invention, the angular position of longitudinal rod 32 of the actuator is defined by appropriate drive from a stepping motor, which causes rotation through a specified angle of rod 32 of actuator 30 around its axis A2.

a second phase, that of engagement, in which rod 32 of actuator 30 is displaced longitudinally to the front or to the rear as illustrated in FIG. 1, yoke 36 then bearing respectively on one of the bearing surfaces 28 or 26 of fork 12, which has been preselected in such a way as to displace this fork 12 longitudinally toward the front or toward the rear. In this way, selected fork 12 causes axial displacement of an interlocking band and engagement of one of the ratios associated with that band.

During the shift from one gear reduction ratio to another, longitudinal rod 32 of the actuator is returned longitudinally to the intermediate position in which it is disposed in the transverse plane corresponding to the dead-point position of the gearbox, then it is displaced axially toward its other position of engagement with the other ratio associated with that band, or it is displaced in rotation toward another toe 24 of another fork 12 of the gearbox, then it is again displaced longitudinally to engage another ratio of the gearbox.

This arrangement is particularly advantageous, because a single actuator makes it possible to drive the movement of all forks of the gearbox.

In the case of a gearbox with robotized operation, the compactness of such a system is particularly advantageous, since the electronic control system (not illustrated) associated with the operation of the rotolinear hydraulic cylinder controls only a single rotolinear hydraulic cylinder, thus permitting the design thereof to be simplified.

In the case of a gearbox with manual operation, this arrangement also makes it possible to simplify considerably the operation of the gearbox.

In addition, the provision of forks 12 on a single common axle 14 considerably simplifies the arrangement of forks 12 in the gearbox case, and makes it possible to construct a gearbox that is substantially more compact than the conventional gearboxes, while reducing the risks of failure of the operations of engagement of ratios by virtue of the smaller number of mechanical parts involved.

What is claimed is:

1. A motor-vehicle gearbox provided with at least two longitudinal parallel shafts provided with at least two gear pairs, in each of which an idler pinion, mounted to rotate on a first shaft, engages with a fixed pinion supported by a second shaft, and provided with means for interlocking each idler pinion on its shaft by means of axially movable coaxial bands, under actuation of operating means provided with operating forks which are mounted to slide in parallel on the shafts, each of which forks are equipped with a transverse foot, at the end of which there is provided a contact toe, the toes being aligned transversely along an arc of a circle to be received in a yoke of an actuator which can be driven in transverse displacement along an arc of the circle to select a fork associated with a gear reduction ratio, and parallel to the shafts to engage the ratio associated with the selected fork by longitudinally displacing a band for interlocking of the idler pinion corresponding to this ratio, wherein all operating forks are mounted to slide on a common axle of the forks, parallel to the shafts, and wherein all operating forks are immobilized in rotation relative to the common axle.

2. A gearbox according to claim 2, wherein at most one interlocking band is provided close to an idler pinion, to occupy selectively a neutral position or an interlocked position of the single pinion in question, said interlocked position corresponding to engagement of a gear reduction ratio, and wherein the other interlocking bands are provided between two idler pinions, to occupy a neutral position or two opposite interlocked positions of each of the idler pinions in question, said interlocked positions being situated axially on two sides of the neutral position and each corresponding to engagement of a gear reduction ratio.

3. A gearbox according to claim 2, wherein the actuator is provided with a rod, longitudinal and parallel to the shafts, which is provided with a transverse arm, at the end of which there is provided the yoke, which can occupy a plurality of predefined angular selection positions, each of which corresponds to selection of a fork, and at least two predefined longitudinal shift positions, which comprise at least one extreme longitudinal position of engagement of one of the gear reduction ratios and a neutral position.

4. A gearbox according to claim 3, wherein the fork axle is coaxial with the rod of the actuator.

5. A gearbox according to claim 1, wherein the idler pinions and the associated interlocking bands are provided axially on the first shaft of the gearbox.

6. A gearbox according to claim 5, wherein said gearbox is robotized.

7. A gearbox according to claim 5, wherein said gearbox is operated manually.

8. A motor-vehicle gearbox comprising:

a primary shaft and a secondary shaft provided with at least two gear pairs, said primary shaft and said secondary shaft being parallel, said primary shaft having a first idler pinion rotatably mounted thereon and a first fixed pinion supported thereon, said secondary shaft having a second idler pinion rotatably mounted thereon and a second fixed pinion supported thereon, said first idler pinion being configured to engage said second fixed pinion, said second idler pinion being configured to engage said first fixed pinion;

a first axially movable band configured to interlock said first idler pinion on said primary shaft;

a second axially movable band configured to interlock said second idler pinion on said secondary shaft, said second axially movable band being coaxial with said first axially movable band;

a plurality of operating forks mounted to slide on a common axle and in parallel to said primary and secondary shafts, each fork of said plurality of forks being equipped with a transverse foot having an end with a contact toe, said toes being aligned transversely along an arc of a circle, said plurality of operating forks being in a fixed rotational relationship with respect to said common axle; and an actuator having a yoke configured to receive one of said toes along the arc, said actuator being rotatable along the arc to select one of said plurality of forks associated with a gear reduction ratio, and being driveable in a longitudinal direction parallel to said primary and secondary shafts to engage said gear reduction ratio associated with said selected fork by longitudinally displacing a respective axially movable band for interlocking of the idler pinion corresponding to said gear reduction ratio.

9. A operation mechanism for a motor-vehicle gearbox comprising:

a plurality of operating forks mounted to slide on a common axle and in parallel to a pinion shaft axis, each fork of said plurality of forks being equipped with a transverse foot having an end with a contact toe, said toes being aligned transversely along an arc of a circle, said plurality of operating forks being in a fixed rotational relationship with respect to said common axle; and an actuator having a yoke configured to receive one of said toes along the arc, said actuator being rotatable along the arc to select one of said plurality of forks, and being driveable in a longitudinal direction parallel to said pinion shaft axis to actuate said selected fork.

\* \* \* \* \*